(12) United States Patent
Ahn et al.

(10) Patent No.: US 12,367,555 B2
(45) Date of Patent: Jul. 22, 2025

(54) IMAGE PROCESSING APPARATUS AND OPERATION METHOD THEREOF

(71) Applicant: SAMSUNG ELECTRONICS CO., LTD., Suwon-si (KR)

(72) Inventors: Iljun Ahn, Suwon-si (KR); Hanul Shin, Suwon-si (KR); Jaeyeon Park, Suwon-si (KR); Youngchan Song, Suwon-si (KR); Tammy Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 630 days.

(21) Appl. No.: 17/687,343

(22) Filed: Mar. 4, 2022

(65) Prior Publication Data
US 2022/0284555 A1     Sep. 8, 2022

Related U.S. Application Data

(63) Continuation of application No. PCT/KR2022/002063, filed on Feb. 11, 2022.

(30) Foreign Application Priority Data

Mar. 4, 2021 (KR) .................. 10-2021-0029087
Jul. 12, 2021 (KR) .................. 10-2021-0090897

(51) Int. Cl.
*G06F 18/213* (2023.01)
*G06N 20/00* (2019.01)
(Continued)

(52) U.S. Cl.
CPC .............. *G06T 5/30* (2013.01); *G06T 5/50* (2013.01); *G06T 2207/20084* (2013.01); *G06T 2207/20224* (2013.01)

(58) Field of Classification Search
CPC ... G06T 5/30; G06T 5/50; G06T 2207/20084; G06T 2207/20224; G06T 5/70;
(Continued)

(56) References Cited

U.S. PATENT DOCUMENTS 7,643,696 B2   1/2010   Kita
7,813,583 B2   10/2010   Yoo et al.
(Continued)

FOREIGN PATENT DOCUMENTS

CN    109978876 A    7/2019
JP    4780374 B2    9/2011
(Continued)

OTHER PUBLICATIONS

Su et al., Pixel-Adaptive Convolutional Neural Networks, Apr. 10, 2019 (Year: 2019).*

(Continued)

*Primary Examiner* — Amandeep Saini
*Assistant Examiner* — Mehrazul Islam
(74) *Attorney, Agent, or Firm* — Sughrue Mion, PLLC

(57) ABSTRACT

An image processing apparatus, including a memory configured to store one or more instructions; and a processor configured to execute the one or more instructions stored in the memory to obtain similarity information indicating a similarity between each pixel of a plurality of pixels included in a first image and an adjacent pixel of the each pixel; generate a weight map including weight information corresponding to the each pixel, based on the similarity information; generate a spatially variant kernel including a plurality of kernels corresponding to the plurality of pixels, based on the weight map and a spatial kernel including weight information based on a location relationship between
(Continued)

the each pixel and the adjacent pixel; and generate a second image by applying the spatially variant kernel to the first image.

12 Claims, 14 Drawing Sheets

(51) Int. Cl.
  *G06T 5/30* (2006.01)
  *G06T 5/50* (2006.01)
(58) Field of Classification Search
  CPC ............. G06T 5/60; G06T 2207/20021; G06T 2207/20081; G06T 2207/20192; G06N 3/048; G06N 3/0464; G06N 3/08
  See application file for complete search history.

(56) References Cited

U.S. PATENT DOCUMENTS

| | | | |
|---|---|---|---|
| 8,310,567 B2 | 11/2012 | Kim et al. | |
| 8,855,213 B2 | 10/2014 | Filippini et al. | |
| 9,082,180 B2 | 7/2015 | Cabral | |
| 9,088,685 B2 | 7/2015 | Park et al. | |
| 9,330,442 B2 | 5/2016 | Kang | |
| 9,805,294 B2 | 10/2017 | Liu et al. | |
| 9,965,705 B2 | 5/2018 | Chen et al. | |
| 10,404,930 B2 | 9/2019 | Shin et al. | |
| 10,448,014 B2 | 10/2019 | Possos et al. | |
| 2007/0196031 A1* | 8/2007 | Chen ...................... G06V 10/30 382/278 | |
| 2015/0093041 A1* | 4/2015 | Kang ........................ G06T 5/70 382/275 |
| 2017/0124432 A1 | 5/2017 | Chen et al. | |
| 2019/0130265 A1* | 5/2019 | Ling ...................... G06N 3/063 |
| 2022/0019844 A1 | 1/2022 | Park et al. | |
| 2022/0164669 A1* | 5/2022 | Yao ......................... G06N 3/045 |

FOREIGN PATENT DOCUMENTS

| | | |
|---|---|---|
| KR | 10-2011-0048922 A | 5/2011 |
| KR | 10-1225056 B1 | 1/2013 |
| KR | 10-1776501 B1 | 9/2017 |
| KR | 10-2020-0067631 A | 6/2020 |
| KR | 10-2144994 B1 | 8/2020 |
| KR | 10-2247564 B1 | 5/2021 |
| WO | 2020/113160 A2 | 6/2020 |

OTHER PUBLICATIONS

Kim et al., Efficient Semantic Segmentation Using Spatio-Channel Dilated Convolutions, Oct. 23, 2019 (Year: 2019).*
Dong et al., "Compression Artifacts Reduction by a Deep Convolutional Network", 2015, ICCV, 9 pages total.
Zhang, et al., "Beyond a Gaussian Denoiser: Residual Learning of Deep CNN for Image Denosing", 2016, arXiv:1608.03981v1 [cs.CV], 13 pages total.
Communication dated May 13, 2022 issued by the International Searching Authority in counterpart Application No. PCT/KR2022/002063 (PCT/ISA/220, PCT/ISA/210, and PCT/ISA/237).
Communication issued Jun. 4, 2024 by the European Patent Office in the European Patent Application No. 22763483.9.
Anonymous, "Bilateral filter", Wikipedia, Dec. 1, 2020, XP093161878. (4 pages total).
Su, Hang et al., "Pixel-Adaptive Convolutional Neural Networks", 2019 IEEE/CVF Conference Vision and Pattern Recognition (CVPR), Jun. 15, 2019, pp. 11158-11167, XP033687149. (10 pages total).

* cited by examiner

FIG. 9
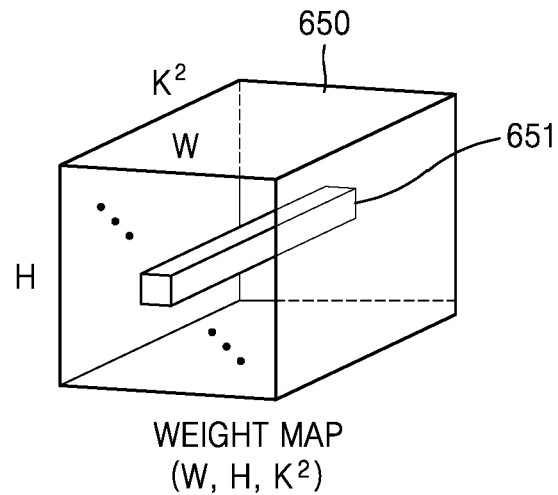
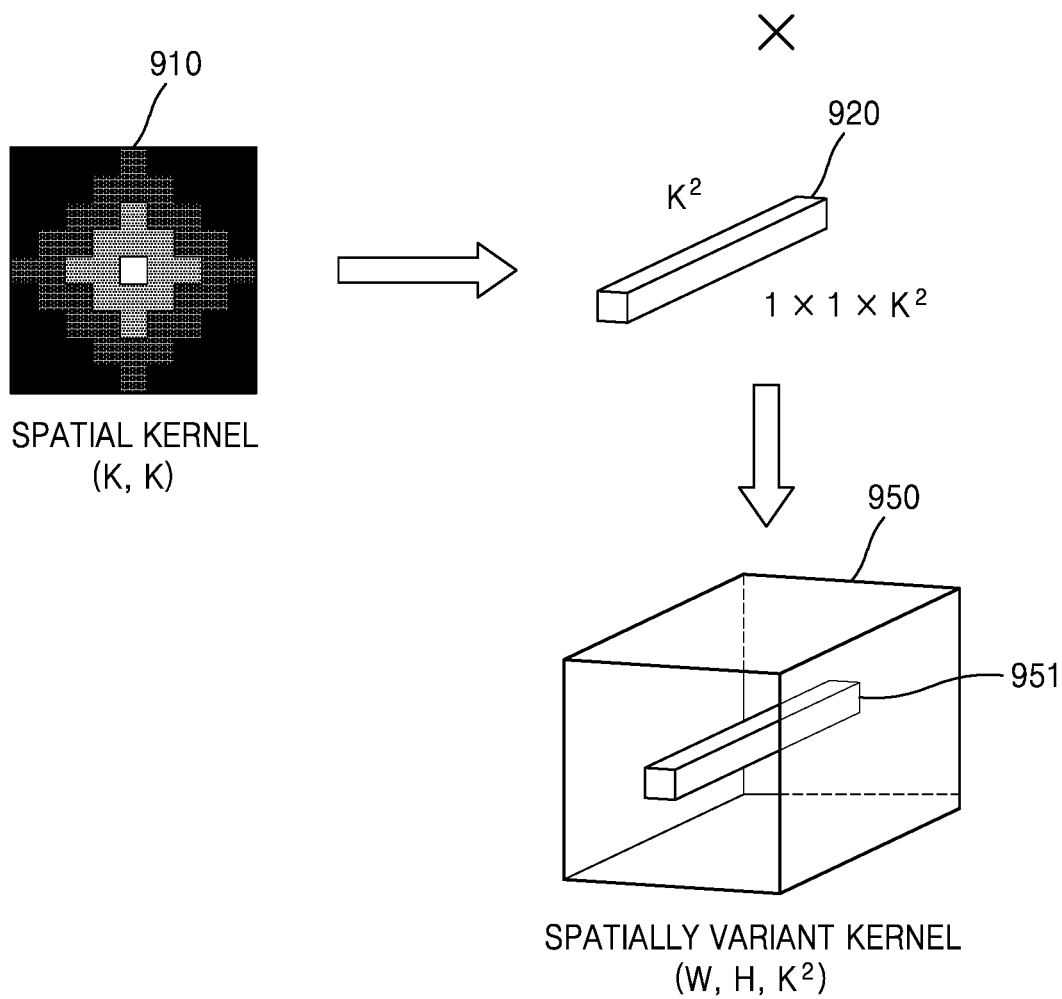

IMAGE PROCESSING APPARATUS AND OPERATION METHOD THEREOF

CROSS-REFERENCE TO RELATED APPLICATIONS

This application is a bypass continuation application of International Application No. PCT/KR2022/002063, filed on Feb. 11, 2022, which claims priority to Korean Patent Application No. 10-2021-0029087, filed on Mar. 4, 2021, and Korean Patent Application No. 10-2021-0090897, filed on Jul. 12, 2021, in the Korean Intellectual Property Office, the disclosures of which are incorporated by reference herein in their entireties.

BACKGROUND

1. Field

The disclosure relates to an image processing apparatus for enhancing quality of an image by using a neural network, and an operation method thereof.

2. Description of Related Art

With the development of computer technology, data traffic has increased exponentially and artificial intelligence has become an important trend leading future innovation. Artificial intelligence may emulate a human's way of thinking, and thus is practically applicable in many ways to many industries. Representative technologies of artificial intelligence include pattern recognition, machine learning, expert systems, neural networks, natural language processing, and the like.

A neural network may be obtained by modeling characteristics of biological neurons of humans by mathematical expression, and may use an algorithm emulating the human ability of learning. Through this algorithm, a neural network may generate mapping between input data and output data, and such a capability of generating mapping may be expressed as a learning capability of the neural network. In addition, a neural network may have a generalization capability of generating correct output data for input data that was not used for learning, based on a learning result.

When image processing such as image denoising is performed by using a deep neural network (for example, a convolutional neural network (CNN) having a deep layer), performance of the image processing may deteriorate when a same kernel (filter) is applied to pixels included in an image. Accordingly, it may be necessary to perform image processing by applying different kernels according to locations or intensity characteristics of the pixels included in the image.

SUMMARY

Various embodiments of the disclosure provide an image processing apparatus capable of performing adaptive image processing according to characteristics of pixels included in an image, by using a convolutional neural network, and an operation method thereof.

An image processing apparatus according to an embodiment of the disclosure can further emphasize features of adjacent pixels having similar features, when image processing is performed on each of a plurality of pixels included in an image, by using similarity information between each pixel and the adjacent pixels.

An image processing apparatus according to an embodiment of the disclosure can perform adaptive image processing according to regional characteristics of pixels, by applying, on pixels included in an image, different kernels generated based on the regional characteristics of the pixels.

An image processing apparatus according to an embodiment of the disclosure can perform denoising of removing noise while maintaining detailed edge processing and texture of an input image, by using a convolutional neural network.

BRIEF DESCRIPTION OF THE DRAWINGS

FIG. 9 is a reference diagram for describing a method of generating a spatially variant kernel, according to an embodiment.

DETAILED DESCRIPTION

Figure 1:
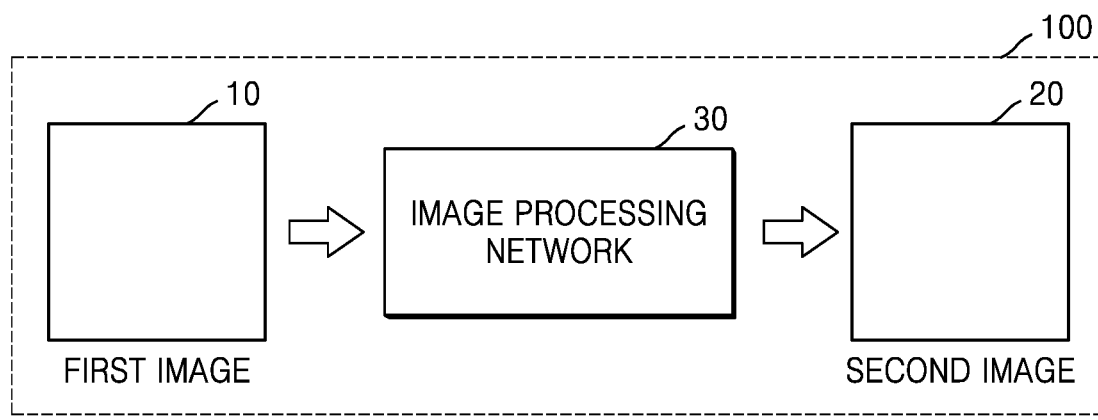
FIG. 1 is a diagram for describing an operation of an image processing apparatus processing an image by using an image processing network, according to an embodiment.

In accordance with an aspect of the disclosure, an image processing apparatus includes a memory configured to store one or more instructions; and a processor configured to execute the one or more instructions stored in the memory to obtain similarity information indicating a similarity between each pixel of a plurality of pixels included in a first image and an adjacent pixel of the each pixel; generate a weight map including weight information corresponding to the each pixel, based on the similarity information; generate a spatially variant kernel including a plurality of kernels corresponding to the plurality of pixels, based on the weight map and a spatial kernel including weight information based on a location relationship between the each pixel and the adjacent pixel; and generate a second image by applying the spatially variant kernel to the first image.

The processor may be further configured to execute the one or more instructions to: obtain first similarity information, based on a difference between the each pixel and a first adjacent pixel at a first relative location with respect to the each pixel; and obtain second similarity information, based on a difference between the each pixel and a second adjacent pixel at a second relative location with respect to the each pixel.

The processor may be further configured to execute the one or more instructions to generate the weight map by performing a convolution operation on the similarity information and one or more kernels included in a convolutional neural network, by using the convolutional neural network.

A number of channels of at least one of the similarity information, the weight map, or the spatially variant kernel may be determined based on a size of the spatial kernel.

In the spatial kernel, a pixel located at a center of the spatial kernel may include a largest value from among values of pixels of the spatial kernel, and wherein the values of the pixels decrease away from the center of the spatial kernel.

A size of the spatial kernel may be K×K and a number of channels of the weight map may be $K^2$, and the processor may be further configured to execute the one or more instructions to: list pixel values included in the spatial kernel in a channel direction to convert the pixel values into a weight vector having a size of $1×1×K^2$; and generate the spatially variant kernel by multiplying the weight vector by each of 1-dimensional vectors having the size of $1×1×K^2$ included in the weight map.

The spatially variant kernel may include a number of kernels equal to a number of the plurality of pixels included in the first image.

The processor may be further configured to execute the one or more instructions to generate the second image by applying a first kernel included in the spatially variant kernel to a first region centered around a first pixel included in the first image and applying a second kernel included in the spatially variant kernel to a second region centered around a second pixel included in the first image.

The processor may be further configured to execute the one or more instructions to: generate a first weight map by performing a convolution operation on the similarity information and one or more kernels included in a convolutional neural network, by using the convolutional neural network; and generate the weight map by performing dilated convolution operation on the first weight map and a first kernel.

A number of channels of the first weight map may be same as a number of channels of the first kernel, and the processor may be further configured to execute the one or more instructions to generate the weight map by performing a depthwise dilated convolution operation on the first weight map and the first kernel.

In accordance with an aspect of the disclosure, an operation method of an image processing apparatus includes obtaining similarity information indicating a similarity between each pixel of a plurality of pixels included in a first image and an adjacent pixel of the each pixel; generating a weight map including weight information corresponding to the each pixel, based on the similarity information; generating a spatially variant kernel including a plurality of kernels corresponding to the plurality of pixels, based on the weight map and a spatial kernel including weight information based on a location relationship between the each pixel and the adjacent pixel; and generating a second image by applying the spatially variant kernel to the first image.

The obtaining of the similarity information may include obtaining first similarity information, based on a difference between the each pixel and a first adjacent pixel at a first relative location with respect to the each pixel; and obtaining second similarity information, based on a difference between the each pixel and a second adjacent pixel at a second relative location with respect to the each pixel.

The weight map may be generated by performing a convolution operation on the similarity information and one or more kernels included in a convolutional neural network, by using the convolutional neural network.

A number of channels of at least one of the similarity information, the weight map, or the spatially variant kernel may be determined based on a size of the spatial kernel.

In the spatial kernel, a pixel located at a center of the spatial kernel may include a largest value from among values of pixels of the spatial kernel, and the values of the pixels decrease away from the center of the spatial kernel.

A size of the spatial kernel may be K×K and a number of channels of the weight map may be $K^2$, and the generating of the spatially variant kernel may include: listing pixel values included in the spatial kernel in a channel direction to convert the pixel values into a weight vector having a size of $1×1×K^2$; and generating the spatially variant kernel by multiplying the weight vector by each of 1-dimensional vectors having the size of $1×1×K^2$ included in the weight map.

The spatially variant kernel may include a number of kernels equal to a number of the plurality of pixels included in the first image.

The generating of the second image may include: applying a first kernel included in the spatially variant kernel to a first region centered around a first pixel included in the first image; and applying a second kernel included in the spatially variant kernel to a second region centered around a second pixel included in the first image.

The generating of the weight map may include generating a first weight map by performing a convolution operation on the similarity information and one or more kernels included in a convolutional neural network, by using the convolutional neural network; and generating the weight map by performing dilated convolution operation on the first weight map and a first kernel.

A number of channels included in the first weight map may be same as a number of channels included in the first kernel, and the generating of the weight map may include generating the weight map by performing a depthwise dilated convolution operation on the first weight map and the first kernel.

In accordance with an aspect of the disclosure, a non-transitory computer-readable recording medium has stored therein a program which, when executed by at least one processor, causes the at least one processor to: obtain similarity information indicating a similarity between each pixel of a plurality of pixels included in a first image and an adjacent pixel of the each pixel; generate a weight map including weight information corresponding to the each pixel, based on the similarity information; generate a spatially variant kernel including a plurality of kernels corresponding to the plurality of pixels, based on the weight map and a spatial kernel including weight information based on a location relationship between the each pixel and the adjacent pixel; and generate a second image by applying the spatially variant kernel to the first image.

In accordance with an aspect of the disclosure, an image processing apparatus includes a memory configured to store one or more instructions; and a processor configured to execute the one or more instructions stored in the memory to: obtain similarity information indicating a similarity between a pixel included in a first image and an adjacent pixel of the first pixel; generate a weight map including weight information corresponding to the pixel, based on the similarity information; generate a spatially variant kernel including a kernel corresponding to the plurality of pixels, based on the weight map and a spatial kernel including weight information based on a location relationship between the pixel and the adjacent pixel; and generate a second image by applying the kernel to a region centered on the pixel.

Throughout the disclosure, the expression "at least one of a, b or c" indicates only a, only b, only c, both a and b, both a and c, both b and c, all of a, b, and c, or variations thereof.

The terms used in the specification will be briefly defined, and the disclosure will be described in detail.

All terms including descriptive or technical terms which are used herein should be construed as having meanings that are obvious to one of ordinary skill in the art. However, the terms may have different meanings according to the intention of one of ordinary skill in the art, precedent cases, or the appearance of new technologies. Also, some terms may be arbitrarily selected by the applicant, and in this case, the meaning of the selected terms will be described in detail in the detailed description of the disclosure. Thus, the terms used herein have to be defined based on the meaning of the terms together with the description throughout the specification.

When a part "includes" or "comprises" an element, unless there is a particular description contrary thereto, the part may further include other elements, not excluding the other elements. In addition, terms such as "unit" and "module" described in the specification denote a unit that processes at least one function or operation, which may be implemented in hardware or software, or implemented in a combination of hardware and software.

As is traditional in the field, embodiments may be described and illustrated in terms of blocks which carry out a described function or functions. These blocks, which may be referred to herein as units or modules or the like, or by names such as driver, controller, device, engine, network, generator, filter, or the like, may be physically implemented by analog or digital circuits such as logic gates, integrated circuits, microprocessors, microcontrollers, memory circuits, passive electronic components, active electronic components, optical components, hardwired circuits, or the like, and may be driven by firmware and software. The circuits may, for example, be embodied in one or more semiconductor chips, or on substrate supports such as printed circuit boards and the like. Circuits included in a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks. Likewise, the blocks of the embodiments may be physically combined into more complex blocks.

Hereinafter, embodiments of the disclosure will be described in detail with reference to the accompanying drawings such that one of ordinary skill in the art may easily implement the disclosure. However, the disclosure may be implemented in various different forms and is not limited to embodiments of the disclosure described herein. Also, in the drawings, parts irrelevant to the description are omitted in order to clearly describe the disclosure, and like reference numerals designate like elements throughout the specification.

FIG. 1 is a diagram for describing an operation of an image processing apparatus processing an image by using an image processing network, according to an embodiment of the disclosure.

Referring to FIG. 1, an image processing network 30 according to an embodiment of the disclosure may be a network receiving a first image 10 and generating a second image 20 having an improved image quality by processing the first image 10. Here, the first image 10 may be an image including noise or may be a low-resolution image. An image processing apparatus 100 may generate the second image 20 by performing denoising that removes noise while maintaining a detailed edge and texture of the first image 10, by using the image processing network 30. The second image 20 may be an image having a higher resolution than the first image 10, and may be an image having an improved image quality compared to the first image 10.

An example of image processing performed by the image processing network 30, according to an embodiment of the disclosure, will be described in detail with reference to drawings below.

Figure 2:
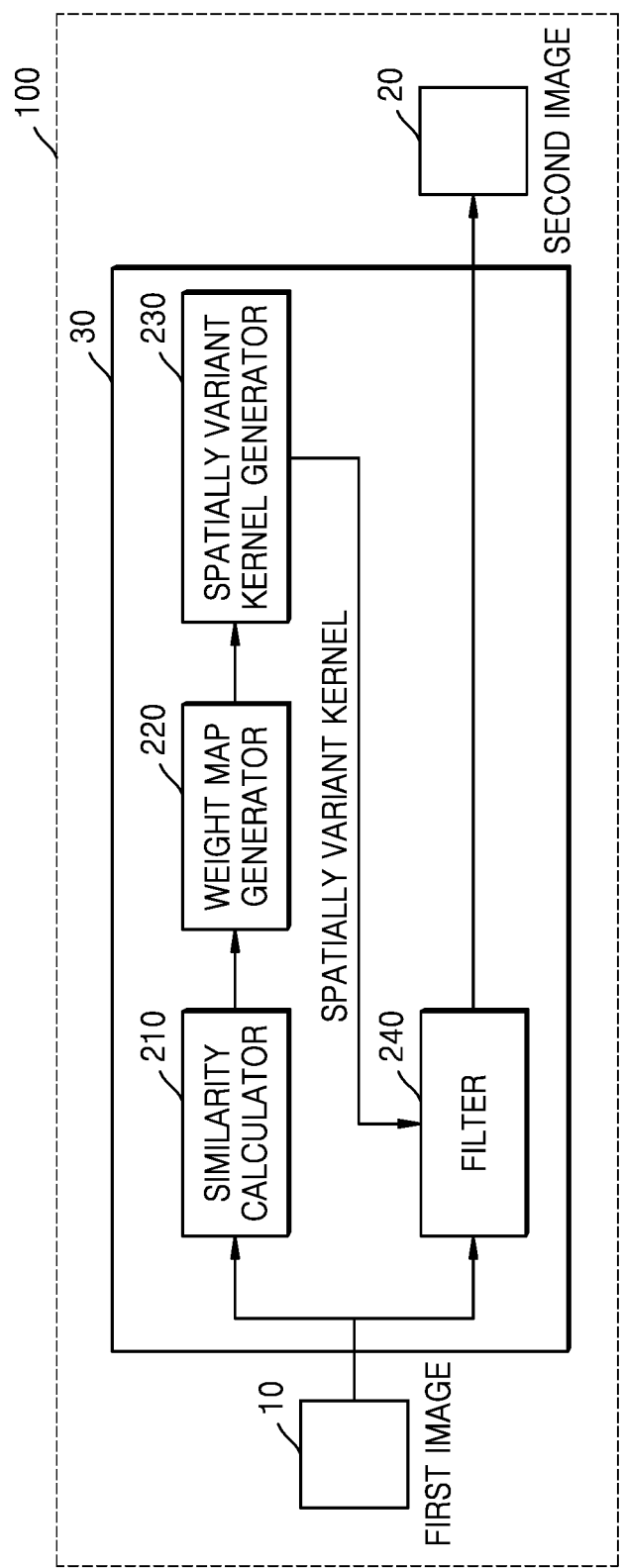
FIG. 2 is a diagram showing an image processing network according to an embodiment.

FIG. 2 is a diagram showing the image processing network according to an embodiment of the disclosure.

Referring to FIG. 2, the image processing network 30 according to an embodiment of the disclosure may include a similarity calculator 210, a weight map generator 220, a spatially variant kernel generator 230, and a filter 240.

The image processing network 30 according to an embodiment of the disclosure may include a structure that receives the first image 10 and outputs the second image 20.

The similarity calculator 210 according to an embodiment of the disclosure may generate similarity information between each of pixels included in the first image 10 and an adjacent pixel. The similarity information may be information indicating a difference between a pixel value of each pixel and a pixel value of an adjacent pixel located adjacent to the each pixel. An example of a method of generating the similarity information will be described in detail with reference to FIG. 3.

Figure 3:
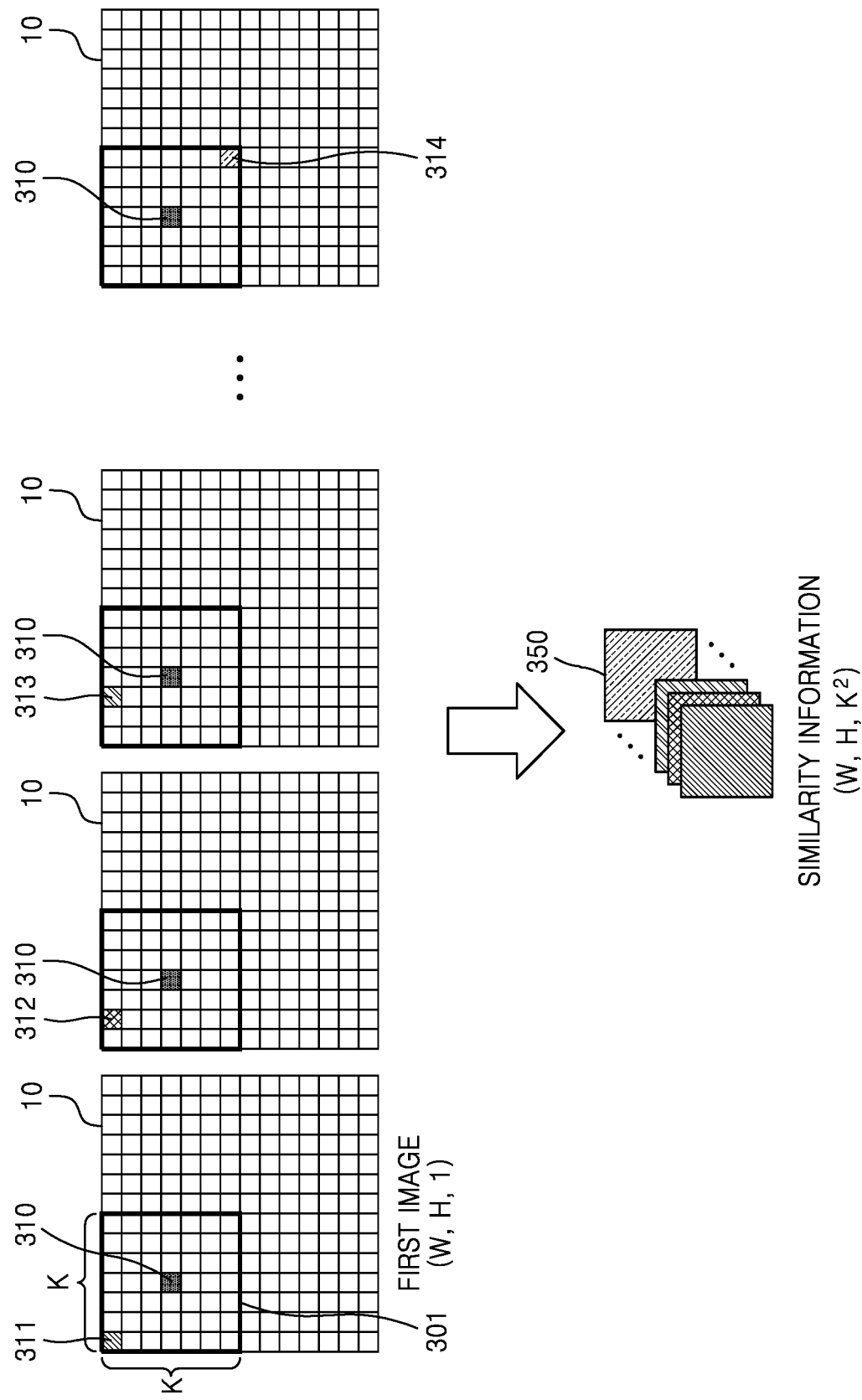
FIG. 3 is a reference diagram for describing a method of generating similarity information, according to an embodiment.

FIG. 3 is a reference diagram for describing the method of generating the similarity information, according to an embodiment of the disclosure.

The similarity calculator 210 according to an embodiment of the disclosure may generate the similarity information by calculating a difference between each of the pixels included in the first image 10 and an adjacent pixel. For convenience of description, in embodiments of the disclosure, it is assumed that a width and height of the first image 10 are respectively W and H, and the number of channels thereof is 1.

Referring to FIG. 3, the similarity calculator 210 may calculate a difference value between a first pixel 310, from among the plurality of pixels included in the first image 10, and each of $K^2$ pixels included in a first region 301 centered around the first pixel 310. Here, in embodiments, a size of the first region 301, i.e., K×K, may be determined based on a size of a spatial kernel described below.

The similarity calculator 210 may calculate the difference value between the first pixel 310 and each of the $K^2$ pixels included in the first region 301, thereby obtaining $K^2$ difference values for the first pixel 310. For example, as shown in FIG. 3, the similarity calculator 210 may calculate a difference value between the first pixel 310 and a first adjacent pixel 311, a difference value between the first pixel 310 and a second adjacent pixel 312, a difference value between the first pixel 310 and a third adjacent pixel 313, and a difference value between the first pixel 310 and a fourth adjacent pixel 314. In the same manner, the similarity calculator 210 may calculate the $K^2$ difference values for other pixels included in the first image 10, in addition to the first pixel 310. For example, the similarity calculator 210 may obtain the $K^2$ difference values with adjacent pixels, by using, as a center pixel, each of pixels other than the first pixel 310.

The similarity calculator 210 may arrange the $K^2$ difference values for each pixel in a channel direction of a corresponding pixel in similarity information 350, and accordingly, a size of the similarity information 350 according to an embodiment of the disclosure may be W×H and the number of channels thereof may be $K^2$.

A first channel image of the similarity information 350 according to an embodiment of the disclosure may indicate a difference value between each of the pixels included in the first image 10 and an adjacent pixel having a first relative location with respect to each of the pixels (for example, a pixel at a location shifted by (K−1)/2 pixels to the left and by (K−1)/2 pixels upwards, based on each of the pixels). Also, a second channel image of the similarity information 350 may indicate a difference value between each of the pixels included in the first image 10 and an adjacent pixel having a second relative location with respect to each of the pixels (for example, a pixel at a location shifted by (K−1)/2−1 pixels to the left and by (K−1)/2 pixels upwards, based on each of the pixels). However, the similarity information 350 is not limited thereto.

An example of a method by which the similarity calculator 210 according to an embodiment of the disclosure obtains the $K^2$ difference values for each of the pixels will be described in detail with reference to FIGS. 4 and 5.

Figure 4:
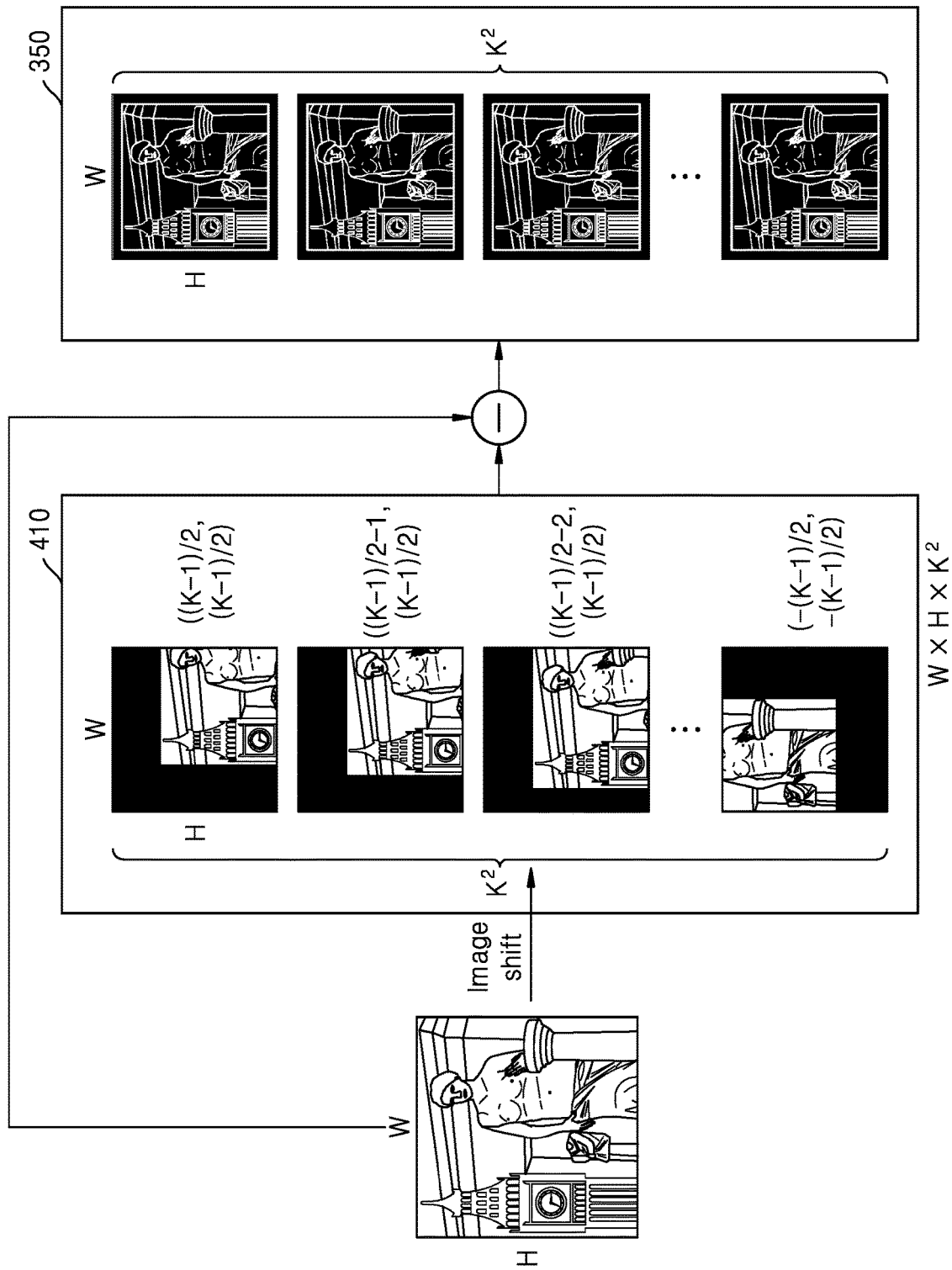
FIGS. 4 and 5 are reference diagrams for describing methods of obtaining similarity information, according to embodiments.
Figure 5:
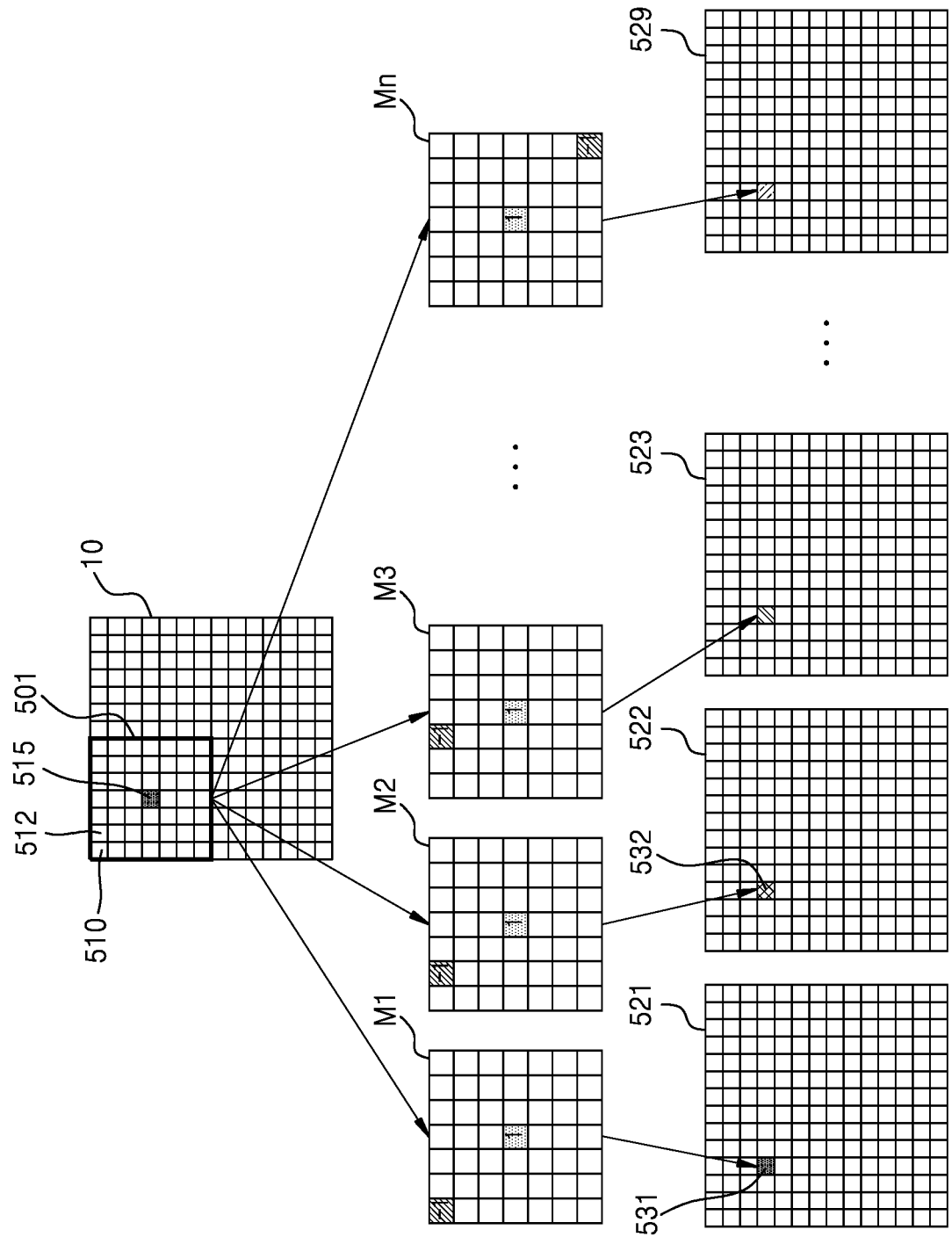

FIGS. 4 and 5 are reference diagrams for describing methods of obtaining similarity information, according to embodiments of the disclosure.

Referring to FIG. 4, the similarity calculator 210 according to an embodiment of the disclosure may obtain $K^2$ images 410 by shifting each of the pixels included in the first image 10 by p pixels (−(K−1)/2≤p≤(K−1)/2, p is an integer) in a horizontal direction and by q pixels (−(K−1)/2≤q≤(K−1)/2, q is an integer) in a vertical direction. Here, each of the $K^2$ images 410 has a same size (W×H) as the first image 10.

The similarity calculator 210 may obtain the similarity information 350 by calculating a difference image between the first image 10 and each of the $K^2$ images 410. Accordingly, as described in FIG. 3, the similarity information 350 may have a size of W×H and the number of channels thereof may be $K^2$.

Referring to FIG. 5, the similarity calculator 210 according to an embodiment of the disclosure may obtain the similarity information 350 by performing mask processing on the first image 10.

The mask processing may be performed via a convolution operation performed on the first image 10 and each of first through n-th mask filters M1 through Mn. Here, n may be $K^2$−1, and $K^2$−1 channel images, i.e., first through $(K^2$−1)-th channel images 521 through 529 included in the similarity information 350 may be generated via mask processing using $K^2$−1 mask filters. For example, the similarity calculator 210 may generate the first channel image 521 of the similarity information 350 via the convolution operation performed on the first image 10 and the first mask filter M1, and generate the second channel image 522 of the similarity information 350 via the convolution operation performed on the first image 10 and the second mask filter M2. Also, the third channel image 523 of the similarity information 350 may be generated via the convolution operation performed on the first image 10 and the third mask filter M3, and the $(K^2$−1)-th channel image 529 of the similarity information 350 may be generated via the convolution operation performed on the first image 10 and the n-th mask filter Mn.

Referring to FIG. 5, the similarity calculator 210 may calculate a pixel value included in the similarity information 350 by multiplying K×K pixel values included in a first region 501 of the first image 10 and each of K×K pixel values, which may be for example parameter values, included in each of the first through n-th mask filters M1 through Mn, and adding results thereof.

Here, parameter values that may be included in a mask filter may be determined according to a location of an adjacent pixel for calculating the similarity information 350. For example, the first mask filter M1 may be a mask filter for calculating similarity information between a center pixel and an adjacent pixel at a first relative location with respect to the center pixel (for example, a location shifted by (K−1)/2 pixels to the left and by (K−1)/2 pixels upwards, based on a reference pixel). Accordingly, in the first mask filter M1, a value of the center pixel may be 1, a value of a pixel at the first relative location with respect to the center pixel may be −1, and values of remaining pixels may be 0.

The similarity calculator 210 according to an embodiment of the disclosure may calculate a value of a second pixel 531 included in the first channel image 521 of the similarity information 350, by performing the convolution operation on the first mask filter M1 and the first region 501 centered around a first pixel 515. Here, a location of the first pixel 515 in the first image 10 and a location of the second pixel 531 in the first channel image 521 of the similarity information 350 may be the same. The value of the second pixel 531 included in the first channel image 521 may be a value obtained by subtracting a value of a pixel 510 at the first relative location with respect to the first pixel 515 from a value of the first pixel 515.

According to the convolution operation using the first mask filter M1, each of the pixels included in the first image 10 may be located at a center of the first mask filter M1, when the first mask filter M1 slides in a horizontal direction and a vertical direction. Here, the reference pixel may be located at a center of a region covered by the first mask filter M1 moving while sliding on the first image 10. The similarity calculator 210 may calculate the values of pixels included in the first channel image 521 by performing the convolution operation on the first mask filter M1 and a changed region.

Also, the second mask filter M2 may be a mask filter for calculating similarity information between a center pixel and an adjacent pixel at a second relative location with respect to the center pixel (for example, a location shifted by (K−1)/2−1 pixels to the left and by (K−1)/2 pixels upwards, based on a reference pixel). Accordingly, in the second mask filter M2, a value of the center pixel may be 1, a value of a pixel at the second relative location with respect to the center pixel may be −1, and values of remaining pixels may be 0.

The similarity calculator 210 according to an embodiment of the disclosure may calculate a value of a third pixel 532 included in the second channel image 522 of the similarity information 350, by performing the convolution operation on the second mask filter M2 and the first region 501 centered around the first pixel 515. Here, a location of the first pixel 515 in the first image 10 and a location of the third pixel 532 in the second channel image 522 may be the same. Accordingly, the value of the third pixel 532 included in the second channel image 522 may be a value obtained by subtracting, from the value of the first pixel 515, a value of a pixel 512 at the second relative location with respect to the first pixel 515.

In the same manner, a region that is subject to a convolution operation is changed such that each of the pixels included in the first image 10 is located at a center of the region that is subject to the convolution operation, and the convolution operation is performed on the changed region and the second mask filter M2, thereby calculating values of the pixels included in the second channel image 522.

Also, the third mask filter M3 may be a mask filter for calculating similarity information between a center pixel and an adjacent pixel at a third relative location with respect to the center pixel, and the n-th mask filter Mn may be a mask filter for calculating similarity information between a center pixel and an adjacent pixel at an n-th relative location with respect to the center pixel.

As illustrated and described in FIG. 5, the similarity calculator 210 according to an embodiment of the disclosure may perform the mask processing by using the $K^2-1$ mask filters, thereby obtaining the similarity information 350 including difference values between each of the pixels included in the first image 10 and the adjacent pixels at first through $K^2-1$ relative locations with respect to each of the pixels. For example, the similarity calculator 210 may generate the first through $K^2-1$ channel images 521 through 529 of the similarity information 350, by using the first through n-th mask filters M1 through Mn.

Also, the similarity information 350 according to an embodiment of the disclosure may include a $K^2$-th channel image indicating similarity information with itself, for each of the pixels included in the first image 10. Accordingly, values of all pixels in the $K^2$-th channel image may be 0.

The methods of obtaining the similarity information 350 illustrated and described in FIGS. 4 and 5 are only examples, and the similarity calculator 210 may obtain similarity information between each of the pixels included in the first image 10 and an adjacent pixel, via various methods.

Referring back to FIG. 2, the weight map generator 220 may generate a weight map based on the similarity information. For example, quality of an image on which image processing is performed may be improved, by using a weight map generated such that a high weight is assigned to adjacent pixels having similar pixel values, for the image processing. Accordingly, the weight map generator 220 may generate the weight map indicating weight information corresponding to each of the pixels included in the first image 10, based on the similarity information between each of the pixels and adjacent pixels. An example of a method of generating the weight map will be described in detail with reference to FIG. 6.

Figure 6:
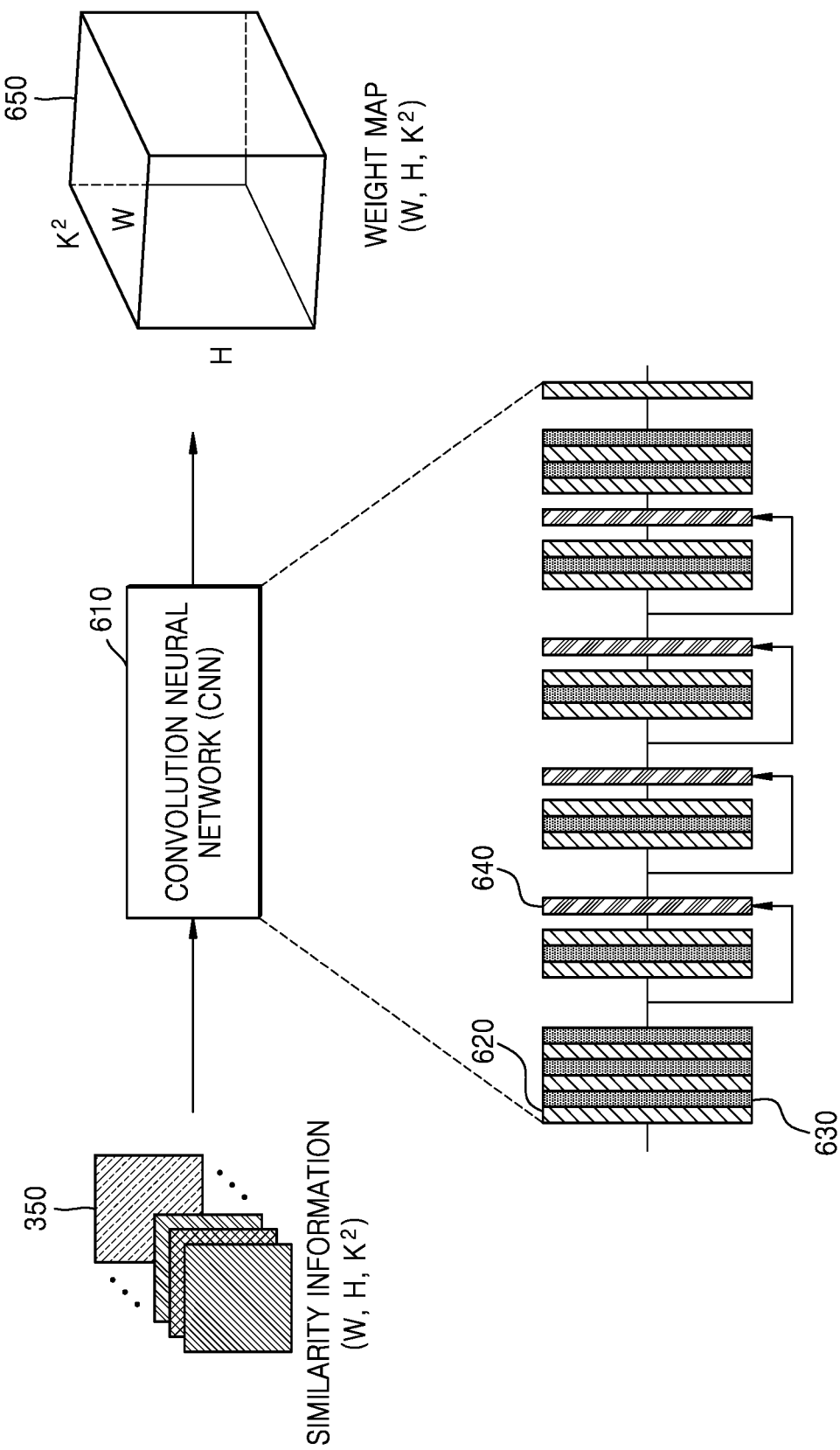
FIG. 6 is a reference diagram for describing a method of generating a weight map, according to an embodiment.

FIG. 6 is a reference diagram for describing a method of generating a weight map, according to an embodiment of the disclosure.

Referring to FIG. 6, the weight map generator 220 may generate a weight map 650 by using a convolutional neural network 610. The similarity information 350 generated by the similarity calculator 210 may be input to the convolutional neural network 610 and pass through the convolutional neural network 610, and thus the weight map 650 may be output. Here, a size of the weight map 650 may be W×H, and the number of channels thereof may be $K^2$.

The convolutional neural network 610 according to an embodiment of the disclosure may include one or more convolution layers 620 and one or more activation layers 630. Here, the activation layer 630 may be located after the convolution layer 620. In embodiments, each of the activation layers, for example activation layer 630, may be located after a corresponding one of the convolution layers, for example convolution layer 620.

Each layer included in the convolutional neural network 610 may have a structure that receives a value output from a previous layer, obtains a result value by performing an operation at the corresponding layer, and outputs the obtained result value to a following layer. For example, in the convolution layer 620, a convolution operation may be performed on a kernel included in the convolution layer 620 and values input to the convolution layer 620. An example of the convolution operation performed in the convolution layer 620 will be described in detail with reference to FIGS. 7 and 8.

Figure 7:
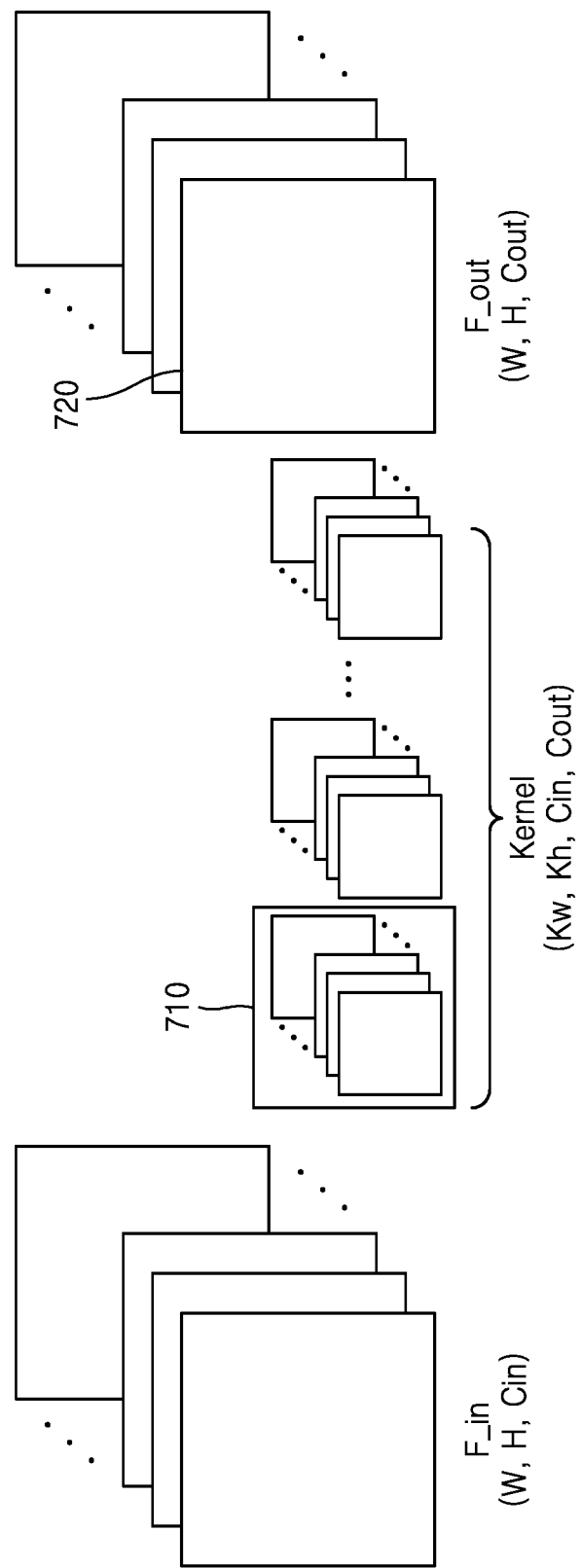
FIGS. 7 and 8 are reference diagrams for describing convolution operations performed in convolution layers, according to embodiments.
Figure 8:
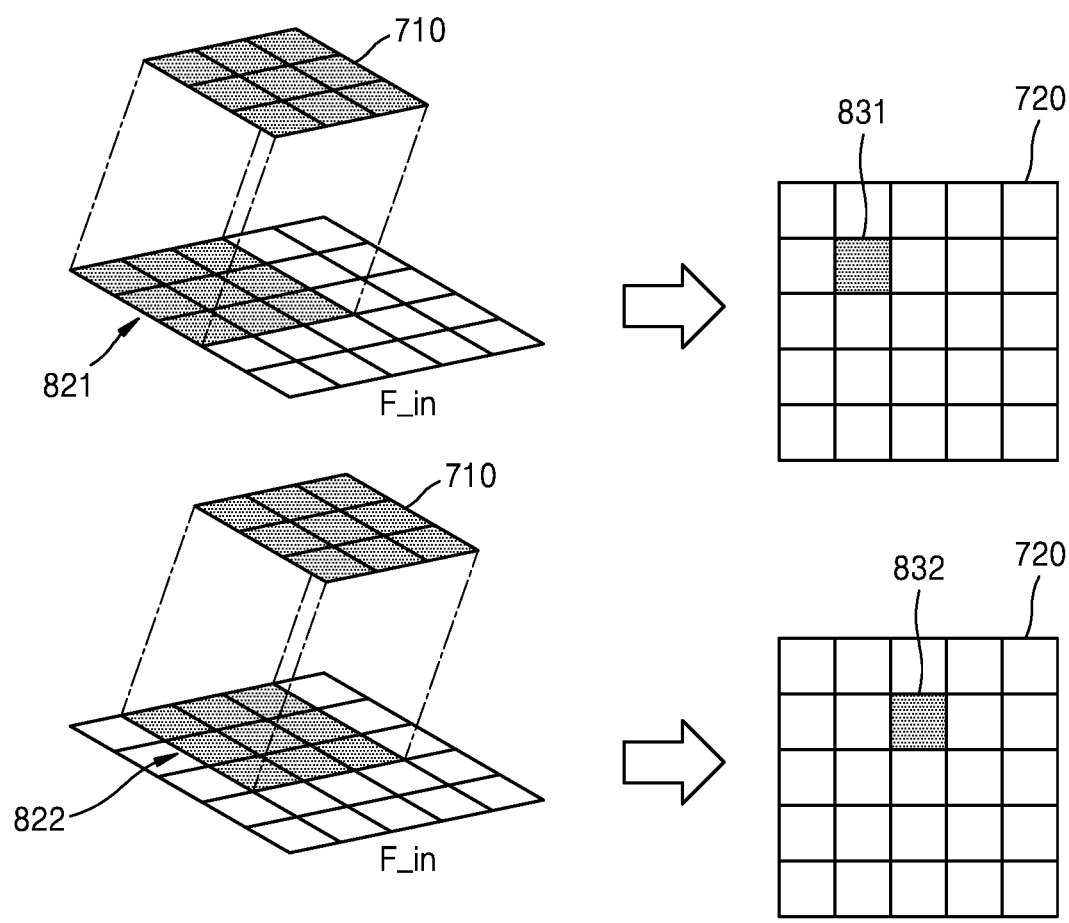

FIGS. 7 and 8 are reference diagrams for describing convolution operations performed in the convolution layers, according to embodiments of the disclosure.

FIG. 7 is a diagram illustrating an input image F_in, or an input feature map, which may be input to the convolution layer 620, a kernel (referred to and illustrated as "Kernel") included in the convolution layer 620, and an output image F_out, or an output feature map, which may be output from the convolution layer 620, according to an embodiment of the disclosure.

Referring to FIG. 7, a size of the input image F_in input to the convolution layer 620 may be W×H, and the number of channels thereof may be $C_{in}$, according to an embodiment of the disclosure. Also, the convolution layer 620 includes the Kernel, and the Kernel may include Cout sub-kernels. Also, one sub-kernel may have a size of Kw×Kh×$C_{in}$. The number $C_{in}$ of channels of one sub-kernel may be equal to the number $C_{in}$ of channels of the input image F_in. The convolution layer 620 may generate the output image F_out by performing a convolution operation on the input image F_in and the Kernel. Here, a size of the output image F_out may be W×H, and the number of channels of the output image F_out may be determined by the number Cout of sub-kernels of the Kernel.

FIG. 8 is a reference diagram for describing a process of generating a first channel image 720 of the output image F_out, via a convolution operation performed on the input image F_in and a first sub-kernel 710 included in the Kernel, according to an embodiment of the disclosure.

In FIG. 8, for convenience of description, it is assumed that the input image F_in has a size of 5×5 and the number of channels thereof is 1. Also, it is assumed that one sub-kernel included in the Kernel applied to the input image F_in has a size of 3×3, and the number $C_{in}$ of channels thereof is 1.

Referring to FIG. 8, a process of extracting a feature of the input image F_in by applying the first sub-kernel 710 from a top left to a bottom right of the input image F_in is illustrated. Here, the first sub-kernel 710 has a size of 3×3 and the number of channels thereof is 1. For example, a convolution operation may be performed by applying the first sub-kernel 710 to pixels included in a top left 3×3 region 821 of the input image F_in.

In other words, one pixel value 831 mapped to the top left 3×3 region 821 may be generated by multiplying pixel values included in the top left 3×3 region 821 and parameter values included in the first sub-kernel 710, and adding results thereof.

Also, one pixel value 832 mapped to a 3×3 region 822 may be generated by multiplying pixel values included in the 3×3 region 822 obtained by moving the top left 3×3 region 821 of the input image F_in to the right by one pixel and the parameter values included in the first sub-kernel 710, and adding results thereof.

In the same manner, the parameter values included in the first sub-kernel 710 and pixel values of the input image F_in are multiplied and results thereof are added while sliding the first sub-kernel 710 from left to right on the input image F_in by one pixel from top to bottom, thereby generating pixel values included in the first channel image 720 of the output image F_out. Here, data that is subject to the convolution operation may be sampled while moving by one pixel, or in embodiments may be sampled while moving by two or more pixels. A size of an interval of pixels sampled during a sampling process is referred to as a stride, and a size of the output image F_out may be determined according to a size of the stride. As shown in FIG. 8, padding may be performed such that the size of the output image F_out is the same as that of the input image F_in. In the padding, the size of the input image F_in may be increased by assigning a specific value (for example, 0) to an edge of the input image F_in so as to prevent the size of the output image F_out from decreasing. When the convolution operation is performed after the padding is performed, the size of the output image F_out may be the same as the size of the input image F_in. However, the disclosure is not limited thereto.

Although FIG. 8 only illustrates a result of a convolution operation regarding the first sub-kernel 710, which may be for example the first channel image 720 of the output image F_out, when the convolution operation is performed regarding the Cout sub-kernels, the output image F_out including Cout channel images may be output. In other words, the number of channels of the output image F_out may be determined according to the number of sub-kernels included in the kernel.

Referring back to FIG. 6, the activation layer 630 may be located after the convolution layer 620.

In the activation layer 630 according to an embodiment of the disclosure, an activation function operation in which an activation function is applied to values input to the activation layer 630 may be performed. The activation function operation may assign a non-linear characteristic to first feature information, and the activation function may include a sigmoid function, a Tan h function, a rectified linear unit (ReLU) function, or a leaky ReLU function, but is not limited thereto.

Also, the convolutional neural network 610 may further include an element-wise sum layer 640 performing an element-wise sum operation.

The element-wise sum operation may be an operation of adding values at same locations, when values included in first input information input to the element-wise sum layer 640 and values included in second input information are added to each other.

Accordingly, the weight map 650 may be output when the similarity information 350 according to an embodiment of the disclosure passes through the one or more convolution layers 620, the one or more activation layers 630, and the one or more element-wise sum layers 640 included in the convolutional neural network 610.

Referring back to FIG. 2, the spatially variant kernel generator 230 according to an embodiment of the disclosure may generate a spatially variant kernel, based on the spatial kernel and the weight map 650 generated by the weight map generator 220. Here, the spatial kernel indicates weight information according to a location relationship between each of the pixels included in the first image 10 and an adjacent pixel. An example of a method of generating the spatially variant kernel will be described in detail with reference to FIG. 9.

FIG. 9 is a reference diagram for describing a method of generating a spatially variant kernel, according to an embodiment of the disclosure.

Referring to FIG. 9, the spatially variant kernel generator 230 may generate a spatially variant kernel 950 by using the weight map 650 and a spatial kernel 910. For example, the spatially variant kernel generator 230 may convert the spatial kernel 910 into a one-dimensional (1D) vector, i.e., a weight vector 920. The spatial kernel 910 has a size of K×K, a center pixel value among pixel values included in the spatial kernel 910 is the highest, and pixel values decrease away from a center pixel. The spatially variant kernel generator 230 may list the pixel values included in the spatial kernel 910 and convert the pixel values into the weight vector 920 having a size of 1×1×K$^2$.

The size of weight map 650 generated by the weight map generator 220 may be W×H and the number of channels thereof may be K$^2$.

The spatially variant kernel generator 230 may generate the spatially variant kernel 950 by multiplying the weight map 650 and the weight vector 920. Here, the spatially variant kernel generator 230 may generate the spatially variant kernel 950 by performing element-wise multiplication on each of 1D vectors having a size of 1×1×K$^2$ and included in the weight map 650 and the weight vector 920 having a size of 1×1×K$^2$.

As shown in FIG. 9, a second vector 951 included in the spatially variant kernel 950 may be generated by performing the element-wise multiplication on the weight vector 920 and a first vector 651 having a size of 1×1×K$^2$ and included in the weight map 650. Here, a location of the first vector 651 in the weight map 650 and a location of the second vector 951 in the spatially variant kernel 950 may correspond to each other.

The spatially variant kernel 950 according to an embodiment of the disclosure may have a size of W×H and the number of channels thereof may be K$^2$ like the weight map 650.

Figure 10:
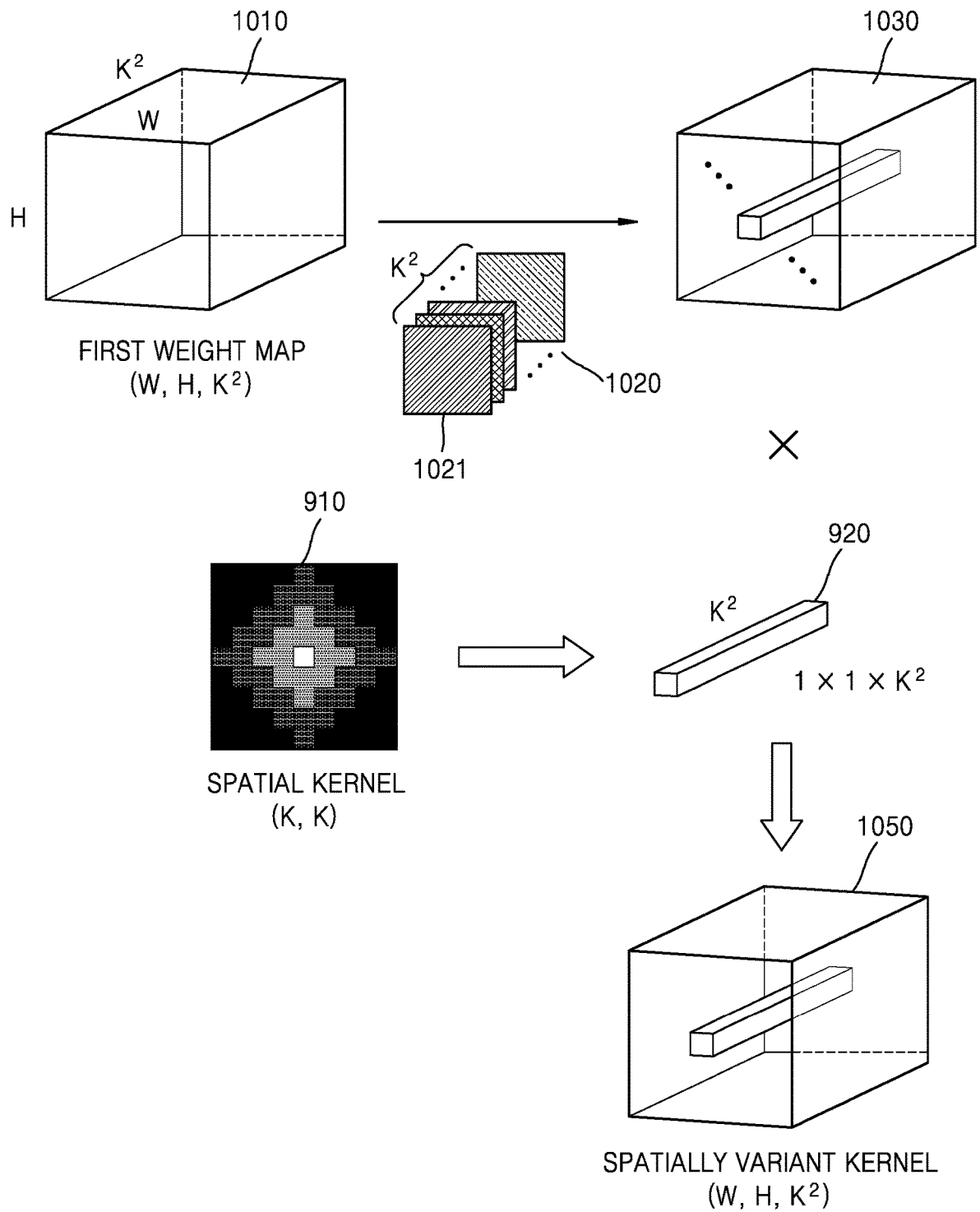
FIG. 10 is a reference diagram for describing a method of generating a spatially variant kernel, according to another embodiment.

FIG. 10 is a reference diagram for describing a method of generating a spatially variant kernel, according to another embodiment of the disclosure.

Referring to FIG. 10, the spatially variant kernel generator 230 may generate a second weight map 1030 by performing a dilated convolution operation on a first weight map 1010 and a first kernel 1020. Here, the first weight map 1010 may correspond to the weight map 650 of FIG. 9.

The dilated convolution operation may refer to a convolution operation performed by applying a kernel to a region larger than the kernel. An example of the dilated convolution operation will be described in detail with reference to FIG. 11.

Figure 11:
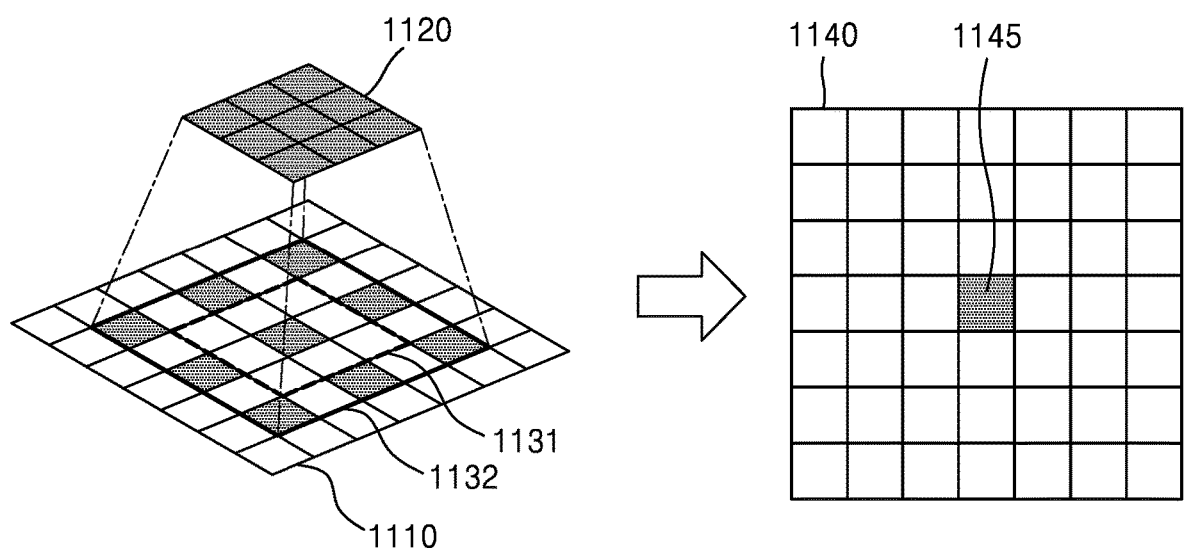
FIG. 11 is a reference diagram for describing a dilated convolution according to an embodiment.

FIG. 11 is a reference diagram for describing a dilated convolution according to an embodiment of the disclosure.

In FIG. 11, for convenience of description, it is assumed that an input image 1110 that is a target of a dilated convolution operation has a size of 7×7 and a size of a kernel 1120 is 3×3.

According to embodiments, in a convolution operation, the kernel 1120 is applied to a region of the input image 1110, which has a size of 3×3. For example, a value of one pixel 1145 of an output image 1140 is generated by multiplying pixel values included in a first region 1131 of the input image 1110, which has a size of 3×3, and values of 3×3 parameters included in a kernel, and adding results thereof.

According to embodiments, in the dilated convolution operation, a size of a region to which the kernel 1120 is applied may be dilated according to a dilation rate. When the dilation rate is 2, a size of a region to which a kernel is applied may be dilated from 3×3 to 5×5. For example, as shown in FIG. 11, the kernel 1120 may be applied to a second region 1132 having a size of 5×5. Here, the value of pixel 1145 of the output image 1140 may be generated by respectively multiplying the values of first through ninth pixels illustrated as shaded pixels, included in the second region 1132 and nine parameter values included in the kernel 1120, and adding results thereof.

Referring back to FIG. 10, the spatially variant kernel generator 230 according to an embodiment of the disclosure may generate the second weight map 1030 by performing a depthwise dilated convolution operation on the first weight map 1010 and first kernel 1020.

The first weight map 1010 according to an embodiment of the disclosure may have a size of W×H and the number of channels thereof may be $K^2$. Also, the number of channels of the first kernel 1020 may be the same as the number of channels of the first weight map 1010, i.e., $K^2$. Accordingly, the first kernel 1020 may include $K^2$ sub-kernels in a channel direction.

The spatially variant kernel generator 230 may generate one channel image included in the second weight map 1030, by performing the dilated convolution operation on one channel image included in the first weight map 1010 and one sub-kernel corresponding to the channel image included in the first weight map 1010. For example, the spatially variant kernel generator 230 may generate a first channel image of the second weight map 1030 by performing the dilated convolution operation on a first channel image of the first weight map 1010 and a first sub-kernel 1021 included in the first kernel 1020.

In the same manner, the spatially variant kernel generator 230 may generate second through $K^2$ channel images included in the second weight map 1030 by performing the dilated convolution operation on second through $K^2$ channel images of the first weight map 1010 and second through $K^2$ sub-kernels, respectively.

The spatially variant kernel generator 230 may generate a spatially variant kernel 1050 by converting the spatial kernel 910 into the weight vector 920 having a size of $1×1×K^2$ and multiplying the second weight map 1030 and the weight vector 920. Here, the spatially variant kernel generator 230 may generate the spatially variant kernel 1050 by performing element-wise multiplication on each of 1D vectors having a size of $1×1×K^2$ and included in the second weight map 1030 and the weight vector 920 having a size of $1×1×K^2$. Because this has been described in detail with reference to FIG. 9, redundant descriptions are not provided again.

Referring back to FIG. 2, the spatially variant kernel generator 230 may output the generated spatially variant kernel 950 or 1050 to the filter 240, and the filter 240 may receive the first image 10 and apply the spatially variant kernel 950 or 1010 to the first image 10, thereby generating the second image 20. An example of a method of generating the second image 20 by applying the spatially variant kernel 950 or 1050 to the first image 10 will be described in detail with reference to FIG. 12.

Figure 12:
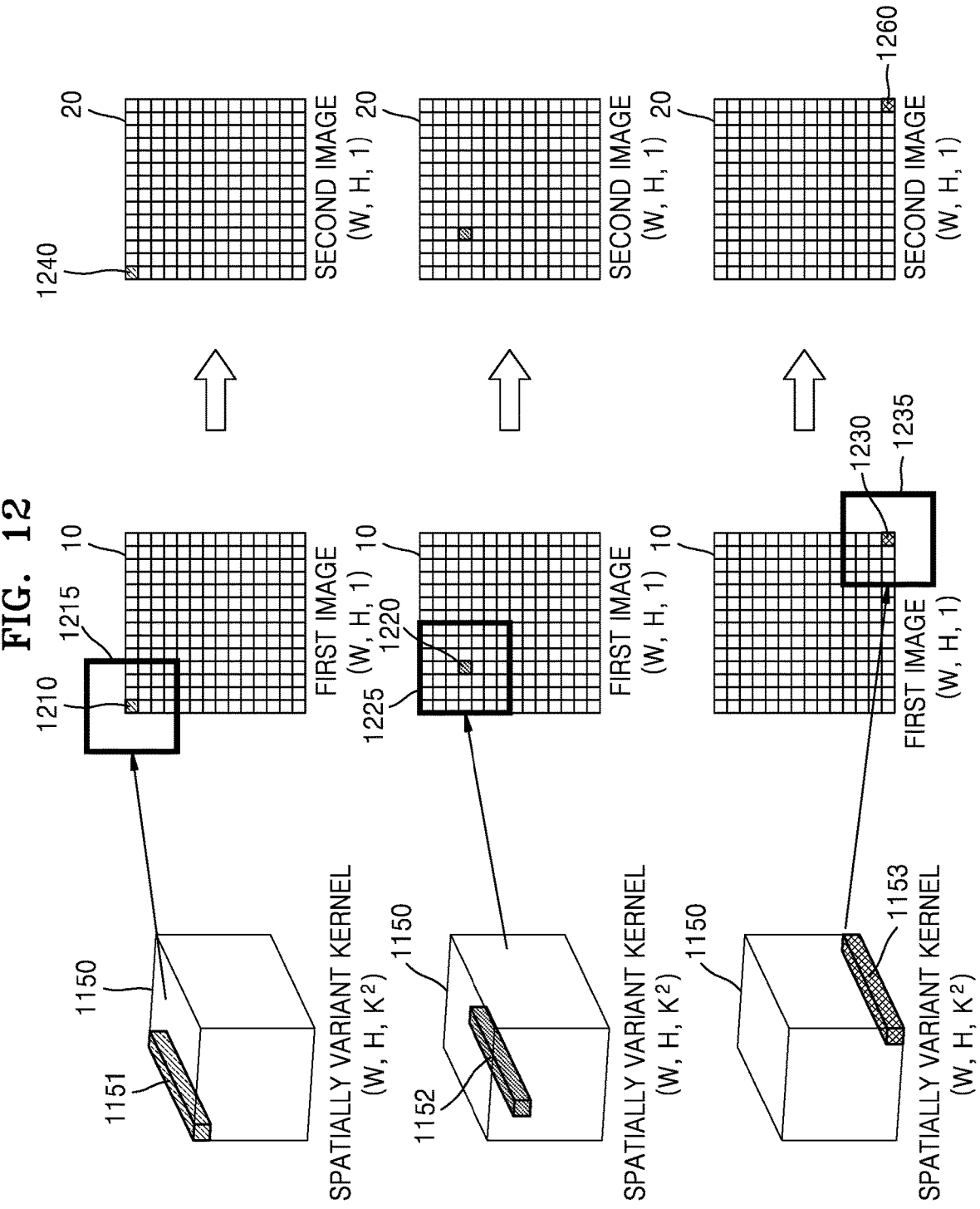
FIG. 12 is a reference diagram for describing a method of applying a spatially variant kernel to a first image, according to an embodiment.

FIG. 12 is a reference diagram for describing a method of applying a spatially variant kernel to the first image, according to an embodiment of the disclosure.

Referring to FIG. 12, a spatially variant kernel 1150 according to an embodiment of the disclosure may be the spatially variant kernel 950 of FIG. 9 or the spatially variant kernel 1050 of FIG. 10, but is not limited thereto.

The spatially variant kernel 1150 may include a kernel vector corresponding to each of the pixels included in the first image 10. For example, the spatially variant kernel 1150 may include a first kernel vector 1151 corresponding to a first pixel 1210 included in the first image 10, and may include a second kernel vector 1152 corresponding to a second pixel 1220 included in the first image 10. Also, the spatially variant kernel 1150 may include a third kernel vector 1153 corresponding to a third pixel 1230 included in the first image 10.

The filter 240 may convert a 1D type kernel vector having a size of $1×1×K^2$ into a 2D type kernel having a size of K×K. For example, the first kernel vector 1151 may be converted into a first kernel 1215, the second kernel vector 1152 may be converted into a second kernel 1225, and the third kernel vector 1153 may be converted into a third kernel 1235.

The filter 240 may calculate a value of a fourth pixel 1240 of the second image 20 by performing filtering on a first region centered around the first pixel 1210 included in the first image 10, by applying the first kernel 1215. Also, the filter 240 may calculate a value of a fifth pixel 1250 of the second image 20 by performing filtering on a second region centered around the second pixel 1220 included in the first image 10, by applying the second kernel 1225. Also, the filter 240 may calculate a value of a sixth pixel 1260 of the second image 20 by performing filtering on a third region centered around the third pixel 1230 included in the first image 10, by applying the third kernel 1235.

In the same manner, the filter 240 may calculate pixel values included in the second image 20 by performing filtering by applying kernels respectively corresponding to the pixels included in the first image 10 to a region centered around each of the pixels included in the first image 10.

Figure 13:
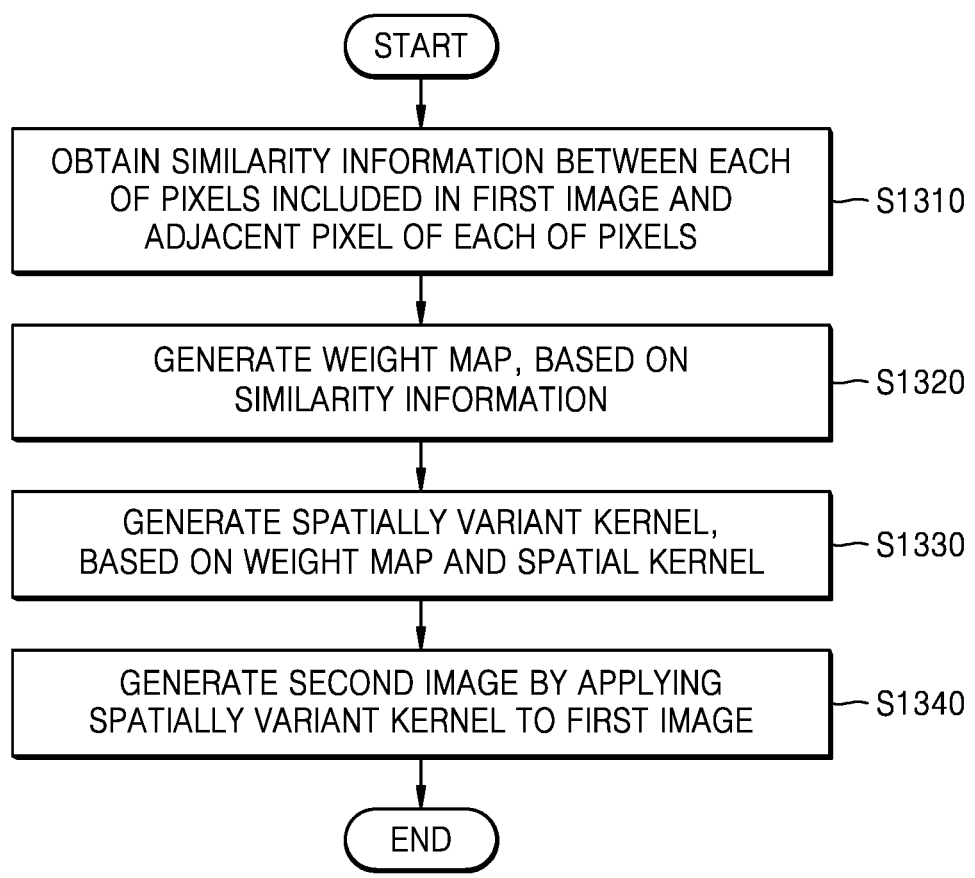
FIG. 13 is a flowchart of an operation method of an image processing apparatus, according to an embodiment.

FIG. 13 is a flowchart of an operation method of the image processing apparatus, according to an embodiment of the disclosure.

Referring to FIG. 13, the image processing apparatus 100 according to an embodiment of the disclosure may obtain similarity information between each of pixels included in a first image and an adjacent pixel of each of the pixels at operation S1310.

The image processing apparatus 100 according to an embodiment of the disclosure may calculate a difference value between a first pixel and each of $K^2$ pixels included in a first region centered around the first pixel, from among a plurality of pixels included in the first image. The image processing apparatus 100 may obtain $K^2$ difference values for the first pixel, and each of the $K^2$ difference values may be determined to be a pixel value corresponding to the first pixel, for each of channel images included in the similarity information. Accordingly, a size of the similarity information may be equal to that of the first image, and the number of channels thereof may be $K^2$.

An example of a method of generating the similarity information according to an embodiment of the disclosure has been described in detail with reference to FIGS. 3 through 5, and thus detailed descriptions thereof are not provided again.

The image processing apparatus 100 may generate a weight map, based on the similarity information at operation S1320.

For example, a quality of an image on which image processing is performed by be improved when the image processing apparatus 100 performs the image processing by assigning a large weight to adjacent pixels having similar pixel values. Accordingly, the image processing apparatus 100 may generate the weight map indicating weight information corresponding to each of the pixels included in the first image, based on the similarity information between each of the pixels and the adjacent pixels.

The image processing apparatus 100 may input the similarity information to a convolutional neural network, and the weight map may be generated as the input similarity information passes through the convolutional neural network. Here, the convolutional neural network may include one or more convolution layers, one or more activation layers, and one or more element-wise sum layers. An example of a method of generating the weight map has been described in detail with reference to FIGS. 6 through 8, and thus detailed descriptions thereof are not provided again.

The image processing apparatus 100 according to an embodiment of the disclosure may generate a spatially variant kernel, based on the weight map and a spatial kernel at operation S1330.

For example, the image processing apparatus 100 may convert the spatial kernel into a 1D vector. The spatial kernel has a size of K×K, a center pixel value among pixel values included in the spatial kernel is the highest, and pixel values decrease away from a center pixel. The image processing apparatus 100 may list the pixel values included in the spatial kernel and convert the pixel values into a weight vector having a size of 1×1×K².

A size of the weight map generated in operation S1320 is W×H, and the number of channels thereof may be K².

The image processing apparatus 100 may generate the spatially variant kernel by multiplying the weight map and the weight vector. Here, the image processing apparatus 100 may generate the spatially variant kernel by performing element-wise multiplication on each of 1D vectors having a size of 1×1×K² and included in the weight map and the weight vector 920 having a size of 1×1×K².

An example of a method of generating the spatially variant kernel has been described in detail with reference to FIGS. 9 through 11, and thus detailed descriptions thereof are not provided again.

The image processing apparatus 100 according to an embodiment of the disclosure may generate a second image by applying the spatially variant kernel to the first image at operation S1340.

The spatially variant kernel generated in operation S1330 may include a kernel vector corresponding to each of the pixels included in the first image. For example, the spatially variant kernel may include a first kernel vector corresponding to a first pixel included in the first image, and may include a second kernel vector corresponding to a second pixel included in the first image.

The image processing apparatus 100 may convert a 1D type kernel vector having a size of 1×1×K² into a 2D type kernel having a size of K×K. For example, the first kernel vector may be converted into a 2D type first kernel and the second kernel vector may be converted into a 2D type second kernel.

The image processing apparatus 100 may calculate a third pixel value included in the second image by performing filtering by applying the first kernel to a region centered around the first pixel, and calculate a fourth pixel value included in the second image by performing filtering by applying the second kernel to a region centered around the second pixel.

Accordingly, the image processing apparatus 100 may perform filtering by applying different kernels according to a location of a center pixel, when performing the filtering on the first image.

Figure 14:
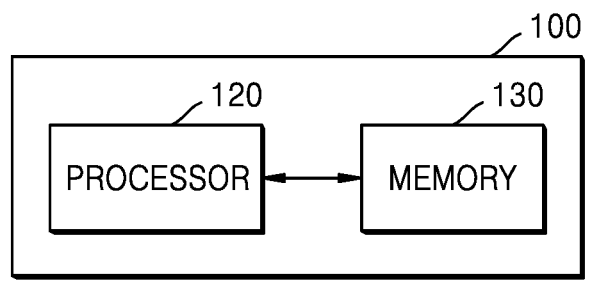
FIG. 14 is a block diagram of a configuration of an image processing apparatus, according to an embodiment.

FIG. 14 is a block diagram of a configuration of the image processing apparatus, according to an embodiment of the disclosure.

Referring to FIG. 14, the image processing apparatus 100 according to an embodiment of the disclosure may include a processor 120 and a memory 130.

Also, the processor 120 according to an embodiment of the disclosure may control the image processing apparatus 100 in general. The processor 120 according to an embodiment of the disclosure may execute one or more programs stored in the memory 130.

The memory 130 according to an embodiment of the disclosure may store various types of data, programs, or applications for driving and controlling the image processing apparatus 100. The program stored in the memory 130 may include one or more instructions. The program, for example including the one or more instructions, or application stored in the memory 130 may be executed by the processor 120.

The processor 120 according to an embodiment of the disclosure may include at least one of a central processing unit (CPU), a graphics processing unit (GPU), or a video processing unit (VPU). According to an embodiment of the disclosure, the processor 120 may be implemented in a form of a system-on-chip (SoC) in which at least one of CPU, GPU, or VPU is integrated. In embodiments, the processor 120 may further include a neural processing unit (NPU).

The processor 120 according to an embodiment of the disclosure may use the image processing network 30 to generate an output image on which denoising that removes noise of an input image while maintaining texture and detailed edge processing is performed. For example, the processor 120 may perform at least one of operations of the similarity calculator 210, weight map generator 220, spatially variant kernel generator 230, and filter 240 illustrated and described in FIGS. 2 through 12.

The processor 120 may obtain similarity information between each of a plurality of pixels included in a first image and an adjacent pixel of each of the pixels. For example, the processor 120 may obtain first similarity information, based on a difference between each of the pixels included in the first image and a first adjacent pixel at a first relative location with respect to each of the pixels. Also, the processor 120 may obtain second similarity information, based on a difference between each of the pixels included in the first image and a second adjacent pixel at a second relative location with respect to each of the pixels.

The processor 120 may generate a weight map, based on the similarity information. The processor 120 may input the similarity information to a convolutional neural network, and output the weight map as the input similarity information passes through the convolutional neural network. Here, the convolutional neural network may include one or more convolution layers, one or more activation layers, and one or more element-wise sum layers. An example of a method of generating the weight map has been described in detail with reference to FIGS. 6 through 8, and thus detailed descriptions thereof are not provided again.

The processor 120 may generate a spatially variant kernel, based on the weight map and a spatial kernel. For example, the processor 120 may convert the spatial kernel into a 1D vector. The spatial kernel has a size of K×K, a center pixel value among pixel values included in the spatial kernel is the highest, and pixel values decrease away from a center pixel. The processor 120 may list the pixel values included in the spatial kernel and convert the pixel values into a weight vector having a size of $1\times1\times K^2$. A size of the weight map according to an embodiment of the disclosure may be W×H and the number of channels may be $K^2$, and the processor 120 may generate the spatially variant kernel by multiplying the weight map and the weight vector. Here, the processor 120 may generate the spatially variant kernel by performing element-wise multiplication on each of 1D vectors having a size of $1\times1\times K^2$ and included in the weight map and the weight vector having a size of $1\times1\times K^2$.

The processor 120 may generate a second image by applying the spatially variant kernel to the first image. The spatially variant kernel may include a kernel vector corresponding to each of the pixels included in the first image. For example, the spatially variant kernel may include a first kernel vector corresponding to a first pixel included in the first image, and may include a second kernel vector corresponding to a second pixel included in the first image.

The processor 120 may convert a 1D type kernel vector having a size of $1\times1\times K^2$ into a 2D type kernel having a size of K×K. For example, the first kernel vector may be converted into a 2D type first kernel and the second kernel vector may be converted into a 2D type second kernel. The processor 120 may calculate a third pixel value included in the second image by performing filtering by applying the first kernel to a region centered around the first pixel, and calculate a fourth pixel value included in the second image by performing filtering by applying the second kernel to a region centered around the second pixel.

In embodiments, the image processing network 30 according to an embodiment of the disclosure may be a network trained by a server or an external device. The external device may train the image processing network 30, based on training data. Here, the training data may include a plurality of data sets including image data containing noise and image data in which noise is removed while an edge characteristic or texture characteristic is maintained.

The server or external device may determine parameter values included in kernels used in each of a plurality of convolution layers included in the image processing network 30. For example, the server or external device may determine the parameter values such that a difference, for example loss information, between image data generated by the image processing network 30 and image data, as the training data, in which noise is removed while an edge characteristic is maintained, is reduced.

The image processing apparatus 100 according to an embodiment of the disclosure may receive, from the server or the external device, the image processing network 30 that has completed the training, and store the same in the memory 130. For example, the memory 130 may store the parameter values and a structure of the image processing network 30 according to an embodiment of the disclosure, and the processor 120 may use the parameter values stored in the memory 130 to generate, from the first image according to an embodiment of the disclosure, the second image in which noise is removed and an edge characteristic is maintained.

The block diagram of the image processing apparatus 100 of FIG. 14 is a block diagram according to an embodiment of the disclosure. Components of the block diagram may be integrated, a component may be added, or a component may be omitted according to the specification of the image processing apparatus 100. In other words, two or more components may be integrated into one component or one component may be divided into two or more components when necessary. Also, a function performed by each block is only for describing embodiments of the disclosure, and specific operations or apparatuses do not limit the scope of the disclosure.

An operation method of an image processing apparatus, according to an embodiment of the disclosure, may be recorded on a computer-readable recording medium by being implemented in a form of program commands executed by using various computers. The computer-readable recording medium may include at least one of a program command, a data file, or a data structure. The program commands recorded in the computer-readable recording medium may be specially designed or well known to one of ordinary skill in the computer software field. Examples of the computer-readable recording medium include magnetic media such as hard disks, floppy disks, and magnetic tapes, optical media such as CD-ROMs and DVDs, magneto-optical media such as floptical disks, and hardware devices specially configured to store and perform program commands, such as read-only memory (ROM), random-access memory (RAM), and flash memory. Examples of the computer command include machine codes generated by a compiler, and high-level language codes executable by a computer by using an interpreter.

Furthermore, the image processing apparatus and the operation method of the image processing apparatus, according to embodiments of the disclosure, may be provided by being included in a computer program product. The computer program products are products that can be traded between sellers and buyers.

The computer program product may include a software program or a computer-readable storage medium storing a software program. For example, the computer program product may include a product (for example, a downloadable application) in a form of a software program that is electronically distributable through a manufacturer of the electronic device or an electronic market (for example, Google PlayStore™ or AppStore™). For electronic distribution, at least a part of the software program may be stored in the storage medium or temporarily generated. In this case, the storage medium may be a storage medium of a server of a manufacturer, a server of an electronic market, or a relay server that temporarily stores the software program.

The computer program product may include a storage medium of a server or a storage medium of a client device in a system including the server and the client device. In embodiments, when there is a third device, e.g., a smartphone, that communicates with the server or the client device, the computer program product may include a storage medium of the third device. In embodiments, the computer program product may include the software program transmitted from the server to the client device or the third device, or transmitted from the third device to the client device.

In this case, one of the server, the client device, and the third device may perform a method according to embodiments of the disclosure by executing the computer program product. In embodiments, two or more of the server, the client device, and the third device may execute the computer program product to perform the method according to the embodiments of the disclosure in a distributed fashion.

For example, the server, for example, a cloud server or an artificial intelligence server, may execute the computer program product stored in the server to control the client device communicatively connected to the server to perform the method according to the embodiments of the disclosure.

While the embodiments of the disclosure have been particularly shown and described in detail, it will be understood by one of ordinary skill in the art that various changes in form and details may be made therein without departing from the spirit and scope of the disclosure as defined by the following claims.

The invention claimed is:

1. An image processing apparatus comprising:
a memory configured to store one or more instructions; and
a processor configured to execute the one or more instructions stored in the memory to:
obtain similarity information indicating a similarity between each pixel of a plurality of pixels included in a first image having a size of W×H, and an adjacent pixel of the each pixel;
generate a weight map having a size of W×H×K$^2$, including weight information corresponding to the each pixel, based on the similarity information;
list pixel values included in a spatial kernel including weight information based on a location relationship between the each pixel and the adjacent pixel, in a channel direction to convert the pixel values into a weight vector having a size of 1×1×K$^2$, wherein a size of the spatial kernel is K×K;
generate a spatially variant kernel having the size of W×H×K$^2$ including W×H vectors, each having the size of 1×1×K$^2$, and corresponding to the plurality of pixels, based on the weight map and the weight vector, wherein the spatially variant kernel is generated by multiplying the weight vector by each of 1-dimensional vectors having the size of 1×1×K$^2$ included in the weight map to generate the W×H vectors, wherein a location of each of the 1-dimensional vectors and a location of each of the W×H vectors correspond to each other; and
generate a second image by applying the spatially variant kernel to the first image,
wherein the W×H vectors are converted into W×H kernels, each having the size of K×K,
wherein a value of a first pixel of the second image is obtained by filtering on a first region centered around a first pixel included in the first image, using a first kernel among the W×H kernels corresponding the first pixel, and
wherein a value of a second pixel of the second image is obtained by filtering on a second region centered around a second pixel included in the first image, using a second kernel among the W×H kernels corresponding the second pixel.

2. The image processing apparatus of claim 1, wherein the processor is further configured to execute the one or more instructions to:
obtain first similarity information, based on a difference between the each pixel and a first adjacent pixel at a first relative location with respect to the each pixel; and
obtain second similarity information, based on a difference between the each pixel and a second adjacent pixel at a second relative location with respect to the each pixel.

3. The image processing apparatus of claim 1, wherein the processor is further configured to execute the one or more instructions to generate the weight map by performing a convolution operation on the similarity information and one or more kernels included in a convolutional neural network, by using the convolutional neural network.

4. The image processing apparatus of claim 1, wherein a number of channels of at least one of the similarity information, the weight map, or the spatially variant kernel is determined based on a size of the spatial kernel.

5. The image processing apparatus of claim 1, wherein, in the spatial kernel, a pixel located at a center of the spatial kernel includes a largest value from among values of pixels of the spatial kernel, and
wherein the values of the pixels decrease away from the center of the spatial kernel.

6. The image processing apparatus of claim 1, wherein the processor is further configured to execute the one or more instructions to:
generate a first weight map by performing a convolution operation on the similarity information and one or more kernels included in a convolutional neural network, by using the convolutional neural network; and
generate the weight map by performing dilated convolution operation on the first weight map and the first kernel.

7. The image processing apparatus of claim 6, wherein a number of channels of the first weight map is same as a number of channels of the first kernel, and
wherein the processor is further configured to execute the one or more instructions to generate the weight map by performing a depthwise dilated convolution operation on the first weight map and the first kernel.

8. An operation method of an image processing apparatus, the operation method comprising:
obtaining similarity information indicating a similarity between each pixel of a plurality of pixels included in a first image having a size of W×H, and an adjacent pixel of the each pixel;
generating a weight map having a size of W×H×K$^2$, including weight information corresponding to the each pixel, based on the similarity information;
listing pixel values included in a spatial kernel including weight information based on a location relationship between the each pixel and the adjacent pixel, in a channel direction to convert the pixel values into a weight vector having a size of 1×1×K$^2$, wherein a size of the spatial kernel is K×K;
generating a spatially variant kernel having the size of W×H×K$^2$ including W×H vectors, each having the size of 1×1×K$^2$ and corresponding to the plurality of pixels, based on the weight map and the weight vector, wherein the spatially variant kernel is generated by multiplying the weight vector by each of 1-dimensional vectors having the size of 1×1×K$^2$ included in the weight map to generate the W×H vectors, wherein a location of each of the 1-dimensional vectors and a location of each of the W×H vectors correspond to each other; and
generating a second image by applying the spatially variant kernel to the first image, and
wherein the W×H vectors are converted into W×H kernels, each having the size of K×K,
wherein a value of a first pixel of the second image is obtained by filtering on a first region centered around a first pixel included in the first image, using a first kernel among the W×H kernels corresponding the first pixel, and
wherein a value of a second pixel of the second image is obtained by filtering on a second region centered around a second pixel included in the first image, using a second kernel among the W×H kernels corresponding the second pixel.

9. The operation method of claim 8, wherein the obtaining of the similarity information comprises:
  obtaining first similarity information, based on a difference between the each pixel and a first adjacent pixel at a first relative location with respect to the each pixel; and
  obtaining second similarity information, based on a difference between the each pixel and a second adjacent pixel at a second relative location with respect to the each pixel.

10. The operation method of claim 8, wherein the weight map is generated by performing a convolution operation on the similarity information and one or more kernels included in a convolutional neural network, by using the convolutional neural network.

11. The operation method of claim 8, wherein a number of channels of at least one of the similarity information, the weight map, or the spatially variant kernel is determined based on a size of the spatial kernel.

12. A non-transitory computer-readable recording medium having stored therein a program which, when executed by at least one processor, causes the at least one processor to:
  obtain similarity information indicating a similarity between each pixel of a plurality of pixels included in a first image having a size of W×H, and an adjacent pixel of the each pixel;
    generate a weight map having a size of W×H×K², including weight information corresponding to the each pixel, based on the similarity information;
    list pixel values included in a spatial kernel including weight information based on a location relationship between the each pixel and the adjacent pixel, in a channel direction to convert the pixel values into a weight vector having a size of 1×1×K², wherein a size of the spatial kernel is K×K;
  generate a spatially variant kernel having the size of W×H×K² including W×H vectors, each having the size of 1×1×K², and corresponding to the plurality of pixels, based on the weight map and the weight vector, wherein the spatially variant kernel is generated by multiplying the weight vector by each of 1-dimensional vectors having the size of 1×1×K² included in the weight map to generate the W×H vectors, wherein a location of each of the 1-dimensional vectors and a location of each of the W×H vectors correspond to each other; and
    generate a second image by applying the spatially variant kernel to the first image,
  wherein the W×H vectors are converted into W×H kernels, each having the size of K×K,
  wherein a value of a first pixel of the second image is obtained by filtering on a first region centered around a first pixel included in the first image, using a first kernel among the W×H kernels corresponding the first pixel, and
  wherein a value of a second pixel of the second image is obtained by filtering on a second region centered around a second pixel included in the first image, using a second kernel among the W×H kernels corresponding the second pixel.

* * * * *